United States Patent
Bhattacharjee et al.

(10) Patent No.: US 9,552,403 B2
(45) Date of Patent: Jan. 24, 2017

(54) CONVERTING DATA MODELS INTO IN-DATABASE ANALYSIS MODELS

(71) Applicants: Arindam Bhattacharjee, Bangalore (IN); Srinivasa Raghu Garimella, Bangalore (IN); Ajay Kumar Gupta, Bangalore (IN); Unmesh Sreedharan, Bangalore (IN); Girish Kalasa Ganesh Pai, Bangalore (IN)

(72) Inventors: Arindam Bhattacharjee, Bangalore (IN); Srinivasa Raghu Garimella, Bangalore (IN); Ajay Kumar Gupta, Bangalore (IN); Unmesh Sreedharan, Bangalore (IN); Girish Kalasa Ganesh Pai, Bangalore (IN)

(73) Assignee: SAP SE, Walldorf (DE)

( * ) Notice: Subject to any disclaimer, the term of this patent is extended or adjusted under 35 U.S.C. 154(b) by 415 days.

(21) Appl. No.: 13/762,546

(22) Filed: Feb. 8, 2013

(65) Prior Publication Data
US 2014/0229491 A1 Aug. 14, 2014

(51) Int. Cl.
*G06F 7/00* (2006.01)
*G06F 17/30* (2006.01)

(52) U.S. Cl.
CPC ............... *G06F 17/30569* (2013.01)

(58) Field of Classification Search
CPC ............ G06F 17/30569; G06F 17/30539; G06F 17/30563
USPC ............................. 707/748, 999.006
See application file for complete search history.

(56) References Cited

U.S. PATENT DOCUMENTS

| 6,865,573 | B1 | 3/2005 | Hornick et al. |
| 6,931,391 | B2 | 8/2005 | Tang et al. |
| 7,024,417 | B1 * | 4/2006 | Russakovsky et al. |
| 7,085,762 | B2 * | 8/2006 | Medicke et al. |
| 7,360,215 | B2 | 4/2008 | Kraiss et al. |
| 7,558,726 | B2 | 7/2009 | Kraiss et al. |
| 8,010,324 | B1 | 8/2011 | Crowe et al. |
| 8,209,274 | B1 * | 6/2012 | Lin et al. ............ 706/21 |

(Continued)

OTHER PUBLICATIONS

Kaushik K Das et al; Massively Parallel In-Database Predictions using PMML; Proceedings of the 2011 workshop on Predictive markup language modeling; NY USA 2011; pp. 22-27 (http://dl.acm.org/citation.cfm?id=2023601).

(Continued)

*Primary Examiner* — James Trujillo
*Assistant Examiner* — John J Morris

(57) ABSTRACT

Data sets are analyzed to discover trends and determine predictive data models. A data model is determined based on analyzing the data set with a specific algorithm from a set of different analytical algorithms. The data model is stored in a structural file format. The data model is converted into an instantiated object model with the use of a predefined object model. The instantiated object model is converted into an in-database analysis model to score new data within a database system. The scoring is based on the logic in the data model. The in-database analysis model is stored on a database server part of a database system to provide analytical functionality defined in the data model. The new data can be scored with the in-database analysis model. The new data is not extracted from the database system and the scoring is accomplished in-memory.

18 Claims, 10 Drawing Sheets

(56) References Cited

U.S. PATENT DOCUMENTS

| | | |
|---|---|---|
| 8,364,613 B1 * | 1/2013 | Lin et al. .................. 706/12 |
| 8,370,280 B1 * | 2/2013 | Lin et al. .................. 706/12 |
| 8,489,541 B2 | 7/2013 | Muenkel |
| 8,583,696 B2 | 11/2013 | Jhingan |
| 8,595,154 B2 | 11/2013 | Breckenridge et al. |
| 8,600,955 B2 | 12/2013 | Werner |
| 8,719,315 B2 | 5/2014 | Schüler et al. |
| 2008/0294996 A1 | 11/2008 | Hunt et al. |
| 2010/0153467 A1 | 6/2010 | Sun et al. |
| 2011/0145286 A1 * | 6/2011 | LaRowe ........... G06F 17/30864 707/780 |
| 2012/0150576 A1 | 6/2012 | Wagenblatt et al. |
| 2013/0138601 A1 | 5/2013 | Mahalanabis |
| 2013/0316795 A1 | 11/2013 | Vogel |

OTHER PUBLICATIONS

A. Dorneich et al; Embedded Predictive Modeling in a Parallel Relational Database; Proceedings of the 2006 ACM symposium on Applied computing; 6 pages; (http://dl.acm.org/citation.cfm?id=1141409).

* cited by examiner

CONVERTING DATA MODELS INTO IN-DATABASE ANALYSIS MODELS

BACKGROUND

Data mining and statistical analysis enable users to build predictive models and discover hidden insights in their data. Predictive analysis encompasses a number of analytic techniques. For example, large quantities of data can be explored and analyzed, by automatic or semi-automatic means, to discover meaningful patterns and rules present in the analyzed data. Examples of predictions are focused on different challenges such as forecasting future performance, sales, and costs; definition of key influencers; trend determination in a business field; determination of existing relationships in the analyzed data; determination of existing anomalies; etc.

Organizations can gain business value by exploring transactional data typically generated within the enterprise or from unstructured data created by external sources (e.g. social media, historical records). Data used for analysis may be stored in data repositories or databases. For generating a data model based on data, an analysis is performed and an algorithm is applied over the data, which may be pulled out of the database. Once the data model is created, it may be used over new data to make predictions for future events. There are a number of algorithms that can be used when creating the data model: decision trees, regression, factor analysis, cluster analysis, time-series, neural nets, association rules, etc. Such algorithms are provided by different vendors and may be consumed in a data mining application for analysis. For example, the open-source statistical and data mining language and environment, the statistical programming language "R" provides data scientists with a lot of analytic possibilities. The introduction of "in-memory" technology has reduced the time and cost of data processing. The "in-memory" technology allows working with data stored in random access memory (RAM) for processing, without the traditional data retrieval from the database system. In such manner, predictive analysis can be performed against vast volumes of data in real time.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for converting data models into in-database analysis models are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

In various embodiments, raw data may be obtained, analyzed, and processed to discover dependencies and to produce structured data. Raw data refers to data that is not modified or processed in any way and exists in a form that the data has been collected. Structured data refers to data that has been analyzed and a structure of the elements of the data, connections, or relationships between the data elements have been determined. For example, structured data may be database data, data found in reports, and others. Elements of structured data may have relationships with other elements in the data.

Figure 1A:
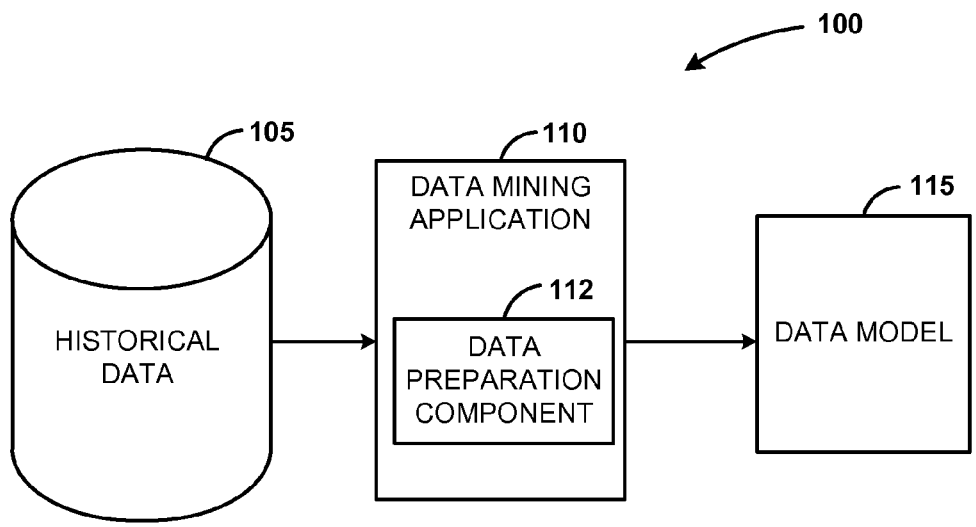
FIG. 1A is a block diagram illustrating an embodiment of a method for generating a data model.

FIG. 1A is a block diagram illustrating an embodiment of a method 100 for generating a data model 115. In one embodiment, the data model 115 is created by training an algorithm over analyzed data, for example, historical data 105. The analysis may be accomplished through pattern recognition technologies, as well as statistical and mathematical techniques. Predictive analysis primarily includes statistical analysis and data mining, and may also include methods and techniques for operations research. Predictive analysis techniques may be applied over the historical data 105 to generate the data model 115. In one embodiment, the data model may be defined as a set of rules derived from analyzed data. A data mining application 110 that provides different algorithms for predictive analysis may be used for generating the data model 115. In one embodiment, a data mining algorithm may be a set of heuristics and calculations that creates a data model (or a data mining model) from data. The data mining application 110 may invoke the historical data 105 and apply statistical operations part of a chosen algorithm and generate the data model 115. The data mining application 110 may be used to analyze the historical data 105.

In one embodiment, the historical data 105 may be read from a data source and be prepared for analysis. The data source storing the historical data 105 may be a data repository. Also, the historical data 105 may be stored in a file format, such as a Comma-Separated Values (CSV) file format. For accurate results, data may need to be prepared and processed before analysis. The preparation steps applied on the analyzed data may be accomplished within the data mining application 110. In one embodiment, the data mining application 110 may include a data preparation component 112 responsible for applying the data preparation steps over the read historical data 105. In one embodiment, data preparation involves checking data for accuracy and missing fields, filtering data based on range values, filtering data to extract inconsistent or unsuitable data, sampling the data to investigate a subset of data, manipulating data, etc. When a model is created by a data mining application outside of any database (such as data mining application 110), the created model (the data model 115) may be used over new data stored in an exemplary database system. In one embodiment, the data mining application 110 may extract the new data from the database and score the new data with the data model 115.

Figure 1B:
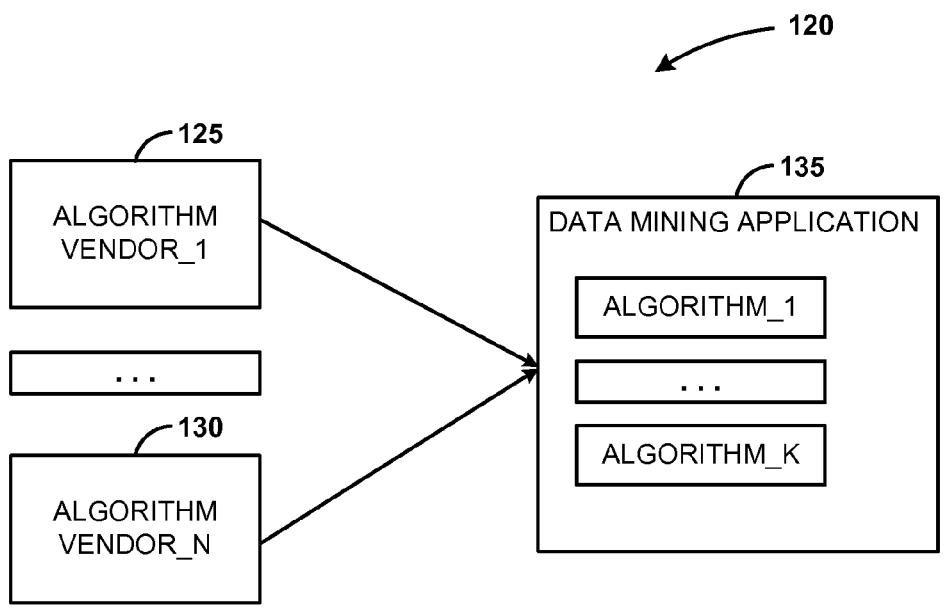
FIG. 1B is a block diagram illustrating an embodiment of an environment of a data mining application that provides algorithms for data analysis from different vendors.

FIG. 1B is a block diagram illustrating an embodiment of an environment 120 of a data mining application 135 that comprises algorithms for data analysis. The data mining application 135 may be used to analyze data from a data source such as the historical data 105, FIG. 1A. The algorithm analyses the provided data and looks for specific types of patterns and trends. Based on the result of such analysis and the defined optimal parameters, the data (mining) model is created. An example of a data model may be a decision tree that predicts an outcome and describes how different criteria affect that outcome; a mathematical model that forecasts sales; a set of clusters that describe how different cases in a dataset are related. In one embodiment, the data mining application 135 may support algorithms from multiple different vendors (sources) to be consumed for analysis, such as Algorithm Vendor_1 125, Algorithm Vendor_N 130, etc. One algorithm vendor may provide a couple of algorithms to be integrated in the data mining application 135. In another embodiment, the data mining application 135 may additionally provide internal proprietary algorithms.

Figure 2:
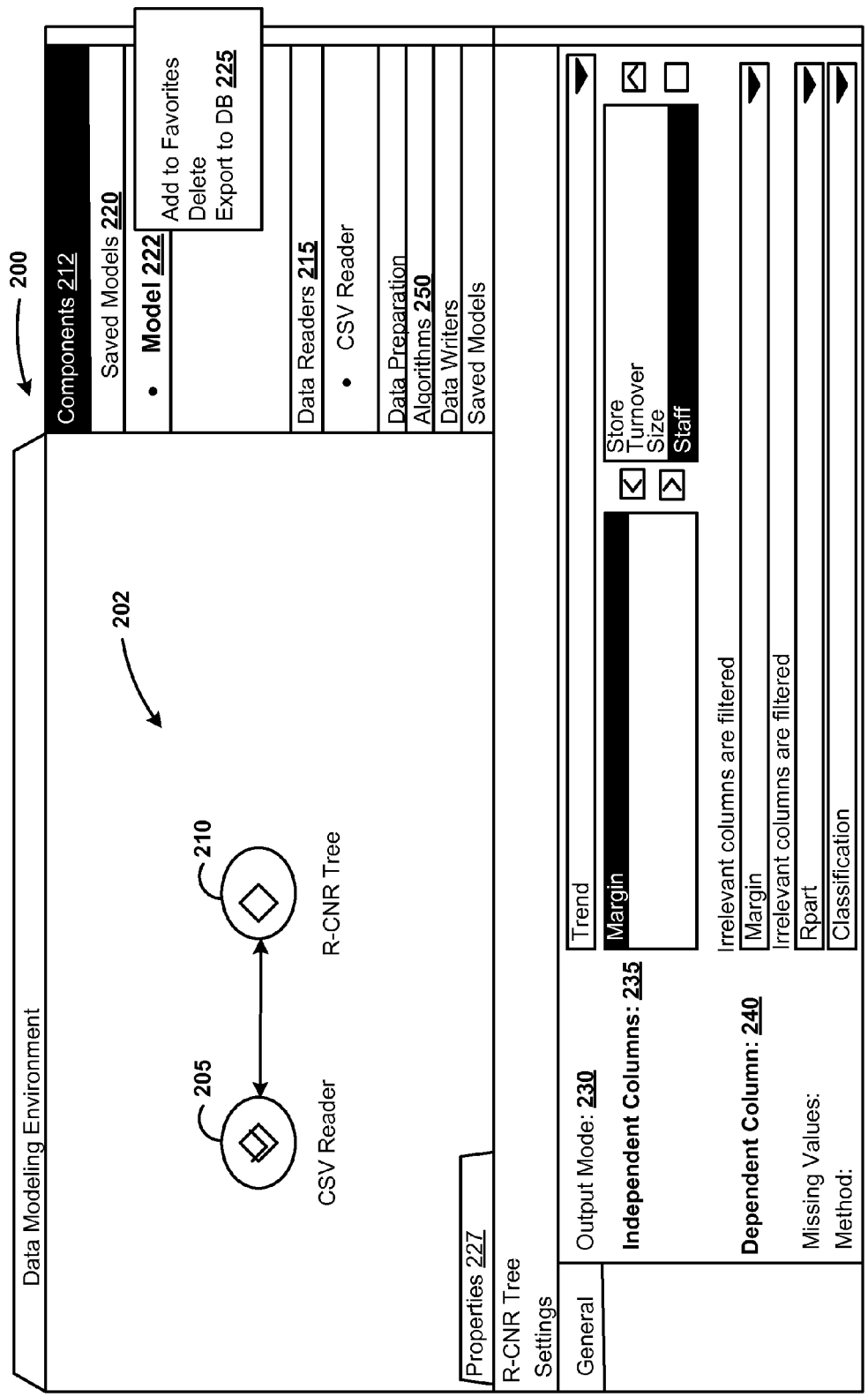
FIG. 2 is an exemplary screenshot, depicting an embodiment of a data modeling environment for creating data models.

FIG. 2 is an exemplary screenshot, depicting an embodiment of a data modeling environment 200 for creating data models. In one embodiment, the data modeling environment 200 may be part of a data mining application (e.g. the data mining application 110 in FIG. 1A). The data modeling environment 200 may have a Components 212 section that includes a section for a Data Readers 215 component. The data modeling environment 200 provides capabilities for generating a data model for a specific use case based applying available algorithms over analyzed data. In one embodiment, the data modeling environment includes a modeling area 202 where the data model may be generated with the use of components part of the Components 212 section. In one embodiment, the modeling area 202 may be used for building a data model. For example, a data reader from the Data Readers 215 section that may be selected for reading data (e.g. historical data 105, FIG. 1A); data preparation methods may be applied over the data; an algorithm may be selected, etc. The data source that contains the data may be selected by using a data reader such as the CSV Reader 205 part of the Data readers 215 component. In one embodiment, the CSV Reader 205 may visualize the data that is analyzed for generating the data model. The visualization of the data may include summary statistics of the data. An appropriate algorithm may be selected from a component Algorithms 250.

For example, if we want to make a segmentation analysis, the algorithm that may be applied over the data may be a Classification aNd Regression (CNR) tree algorithm, such as the R-CNR Tree algorithm provided by the "R" statistical language. An R-CNR Tree 210 model may be generated. Applying the R-CNR Tree algorithm, hidden insights in the data may be revealed. In another embodiment, the data used for the analysis may also be filtered before applying the algorithm. Different properties of the R-CNR Tree 210 model, such as Output Mode 230, Independent Columns 235, Dependent Columns 240, etc., may be defined within a Properties 227 section part of the data modeling environment 200. Based on the generated R-CNR Tree 210 model, a model 222 may be stored within a Saved Models 220 section, part of the Components 212 section.

Once a model is created, it may be used to make predictions for new data. In one embodiment, the model 222 may be considered as a reusable component by training an algorithm using historical data and saving the instance. Typically, models may be created to share computed business rules that can be applied to similar data. Another example of a reason to store a generated data model is to use a trained instance of an algorithm without the presence of the historical data, which is used for generating the data model. The process of using the model is distinct from the process that creates the model. The process of using a model to make predictions for future trends (behavior) is also called "scoring". A model is typically used multiple times to score data. Other applications may use the scores that are generated, e.g. Enterprise Resource Planning (ERP), Customer Relationship Management (CRM), and tools such as OnLine Analytical Processing (OLAP) and data visualization tools. For example, a model may be created to predict the probability that a customer may purchase goods from a supermarket, if a catalog with a list of goods on promotion is regularly sent to the mailbox. Having the option to score data within a database using an already existing model inside of a database can make the execution of the analysis faster and less cumbersome in terms of memory and time consumption. In one embodiment, the generated R-CNR Tree 210 model may be exported together with the information within the model into a file in an industry-standard format, such as Predictive Modeling Markup Language (PMML) format, JavaScript Object Notation (JSON) format, eXtensible Markup Language (XML format, other. In this manner, the model may be shared with other compliant software applications to perform analysis over similar data based on the already generated model. In another embodiment, the generated and saved model 222 may be exported (converted) in a format, which may be executable within a database by applying "Export to DB" 225 functionality.

Figure 3A:
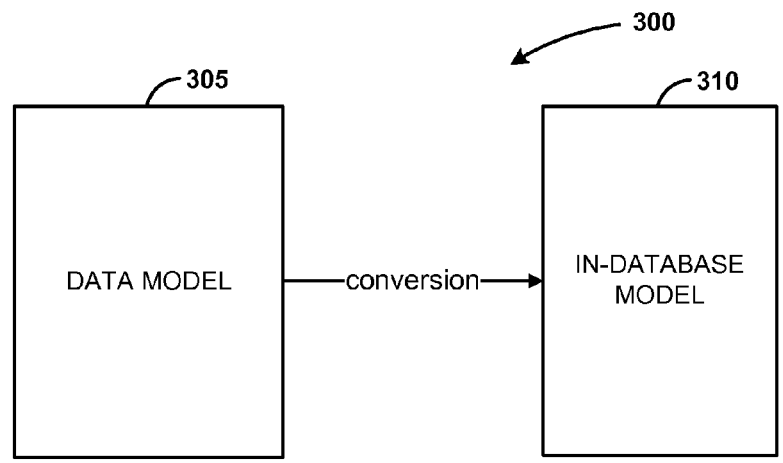
FIG. 3A is a flow diagram illustrating an embodiment of a method for converting a data model into an in-database model.

FIG. 3A is a flow diagram illustrating an embodiment of a method 300 for converting a data model 305 into an in-database model 310. The generated data model 305 includes logic for the organization of the used data (e.g. historical data 105, FIG. 1A). In one embodiment, the data model 305 exists outside of a database and may be generated for example in a PMML format. Generation of the model in a standard format may be accomplished by a data mining application, which is used to construct the data model 305. Table 1 presents part of an exemplary data model representation in a PMML format, which is generated based on the R-CNR Tree algorithm. For example, the data model 305 may be generated in the PMML format from a model created by the R-CNR tree algorithm (provided by the "R" open source language) in a data mining application.

TABLE 1

```
<Header description="RPart Decision Tree Model">
<DataDictionary numberOfFields="5">
<DataField name="as.factor(ClusterNumber)" optype="categorical"
dataType="string">
<DataField name="Turnover" optype="continuous"
dataType="double" />
...
</DataDictionary>
<TreeModel modelName="RPart_Model" functionName="classification"
algorithmName="rpart" splitCharacteristic="binarySplit"
missingValueStrategy="defaultChild">
<MiningSchema>
<MiningField name="as.factor(ClusterNumber)" usageType="predicted" />
<MiningField name="Turnover" usageType="active" />
...
</MiningSchema>
<Output>
<Node id="1" score="1" recordCount="76" defaultChild="2">
<True />
<ScoreDistribution value="1" recordCount="37"
confidence="0.486842105263158" />
<ScoreDistribution value="2" recordCount="12"
confidence="0.157894736842105" />
<ScoreDistribution value="3" recordCount="27"
confidence="0.355263157894737" />
<Node id="2" score="1" recordCount="53" defaultChild="4">
<CompoundPredicate booleanOperator="surrogate">
<SimplePredicate field="Staff" operator="greaterOrEqual"
value="4.25" />
<SimplePredicate field="Margin" operator="greaterOrEqual"
value="1.35" />
<SimplePredicate field="Turnover" operator="greaterOrEqual"
value="5.85" />
<SimplePredicate field="Size" operator="greaterOrEqual"
value="2.45" />
</CompoundPredicate>
<ScoreDistribution value="1" recordCount="37"
confidence="0.69811320754717" />
<ScoreDistribution value="2" recordCount="12"
confidence="0.226415094339623" />
<ScoreDistribution value="3" recordCount="4"
confidence="0.0754716981132075" />
<Node id="4" score="1" recordCount="41" defaultChild="8">
<CompoundPredicate booleanOperator="surrogate">
<SimplePredicate field="Turnover" operator="lessThan" value="7.05" />
<SimplePredicate field="Staff" operator="lessThan" value="5.7" />
<SimplePredicate field="Margin" operator="lessThan" value="1.95" />
<SimplePredicate field="Size" operator="lessThan" value="3.5" />
</CompoundPredicate>
<ScoreDistribution value="1" recordCount="37"
confidence="0.902439024390244" />
<ScoreDistribution value="2" recordCount="0" confidence="0" />
<ScoreDistribution value="3" recordCount="4"
confidence="0.097560975609756" />
<Node id="8" score="1" recordCount="38">
<SimplePredicate field="Turnover" operator="greaterOrEqual"
value="5.55" />
<ScoreDistribution value="1" recordCount="37"
confidence="0.973684210526316" />
<ScoreDistribution value="2" recordCount="0" confidence="0" />
<ScoreDistribution value="3" recordCount="1"
confidence="0.0263157894736842" />
```

TABLE 1-continued

```
</Node>
<Node id="9" score="3" recordCount="3">
<SimplePredicate field="Turnover" operator="lessThan" value="5.55" />
<ScoreDistribution value="1" recordCount="0" confidence="0" />
<ScoreDistribution value="2" recordCount="0" confidence="0" />
<ScoreDistribution value="3" recordCount="3" confidence="1" />
</Node>
</Node>
<Node id="5" score="2" recordCount="12">
<CompoundPredicate booleanOperator="surrogate">
<SimplePredicate field="Turnover" operator="greaterOrEqual"
value="7.05" />
<SimplePredicate field="Staff" operator="greaterOrEqual"
value="5.7" />
<SimplePredicate field="Margin" operator="greaterOrEqual"
value="1.95" />
<SimplePredicate field="Size" operator="greaterOrEqual"
value="3.5" />
</CompoundPredicate>
<ScoreDistribution value="1" recordCount="0" confidence="0" />
<ScoreDistribution value="2" recordCount="12" confidence="1" />
<ScoreDistribution value="3" recordCount="0" confidence="0" />
</Node>
</Node>
<Node id="3" score="3" recordCount="23">
<CompoundPredicate booleanOperator="surrogate">
<SimplePredicate field="Staff" operator="lessThan" value="4.25" />
<SimplePredicate field="Margin" operator="lessThan" value="1.35" />
<SimplePredicate field="Turnover" operator="lessThan" value="5.85" />
<SimplePredicate field="Size" operator="lessThan" value="2.45" />
</CompoundPredicate>
<ScoreDistribution value="1" recordCount="0" confidence="0" />
<ScoreDistribution value="2" recordCount="0" confidence="0" />
<ScoreDistribution value="3" recordCount="23" confidence="1" />
</Node>
</Node>
</TreeModel></PMML>
```

In one embodiment, the logic in the data model is incorporated within the mark-up tags used in the structure of the PMML representation. The given example in Table 1 illustrates a tree structure that defines a cluster analysis over a set of analyzed data, such as the R-CNR Tree 210 (FIG. 2). For example, the first child tag of each node (tag names "CompoundPredicate" or "SimplePredicate") represents the split condition of the tree under that node. The child tags named "ScoreDistribution", define the distribution of data in that node. The child nodes of the current node, if any, are presented under the "Node" tag. A leaf node does not contain any child nodes down in the tree hierarchy. The output of the algorithm is cluster values and is represented as a separate node in the PMML file within the "Output" tags.

In one embodiment, the data model 305 may be converted to the in-database model 310 native to a database or a runtime environment. The in-database model 310 may be a runtime analysis object. The conversion may be accomplished within a data mining application by using an exporting functionality, for example, the "Export to DB" 225 in FIG. 2. For example, the data model 305 may be exported dynamically into a runtime object such as the in-database model 310 that may provide predictive analysis capabilities within a database system. The generated in-database model 310 may contain the logic for scoring a set of data with a model in the same manner as the data model 305 without extracting the data from the database system. The logic incorporated in the in-database model 310 may be executed on a database level, for example, on a database server without pulling the data out of the server. In one embodiment, the in-database model 310 may be created in the database server and may be consumed through a connection (e.g. database connectivity service) with the database system thus to utilize the processing power of the database server.

Hence, database servers may provide predictive analysis capabilities to score data through dynamically created in-database models converted from pre-existing data models. The in-database model 310 may be embedded in an exemplary database server thus providing the database server with the analysis capabilities implemented in the data model 305. Scoring new data may be done without the need of historical data for replicating the logic in the data model 305. In one embodiment, processing new data according to the in-database model 310 can be achieved on a database server, as part of a database system.

Figure 3B:
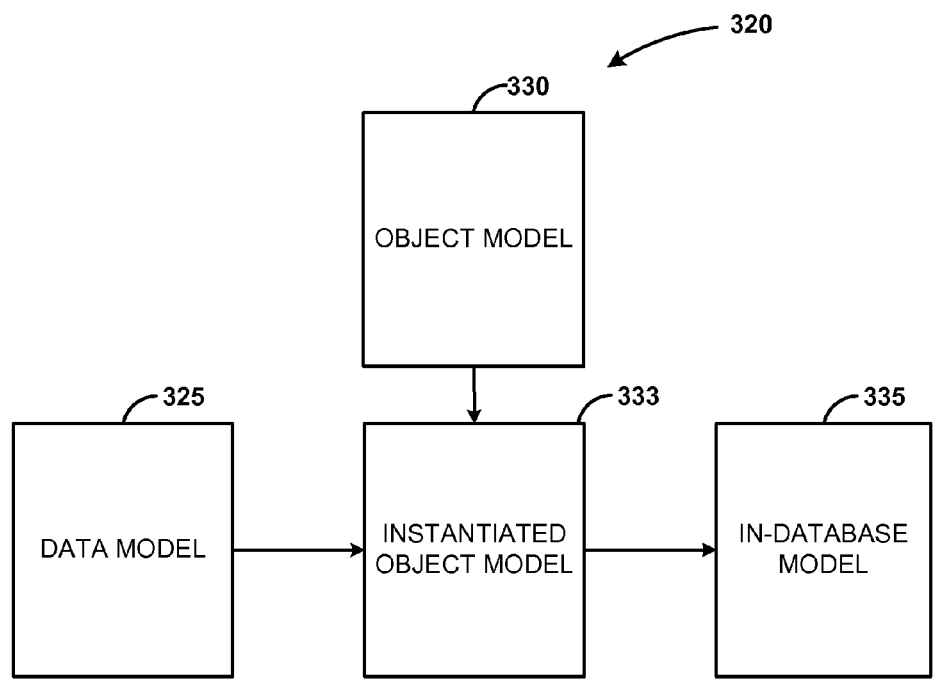
FIG. 3B is a flow diagram illustrating an embodiment of a method for converting a data model into an in-database model by generating an intermediate instantiated object model.

FIG. 3B is a flow diagram illustrating an embodiment of a method 320 for converting a data model 325 into an in-database model 335 by generating an intermediate instantiated object model. In one embodiment, the data model 325 may be converted into the in-database model 335 through the intermediate object model—an instantiated object model 333. The instantiated object model 333 may be generated based on an object model 330 that represents a predefined model including objects that correspond to elements part of the data model 325. In one embodiment, that data model 325 may be in a standard format, such as the PMML format. The object model 330 may be a simple structure that holds common attributes of an algorithm, such as the algorithms provided by the data mining application 135 in FIG. 1B. The intermediate instantiated object model 333 may be defined as a data representation in a programming language that instantiates objects from the object model 330 with data from the data model 325 by applying a binding mechanism between the data model 325 and the structure of the object model 330.

Figure 4:
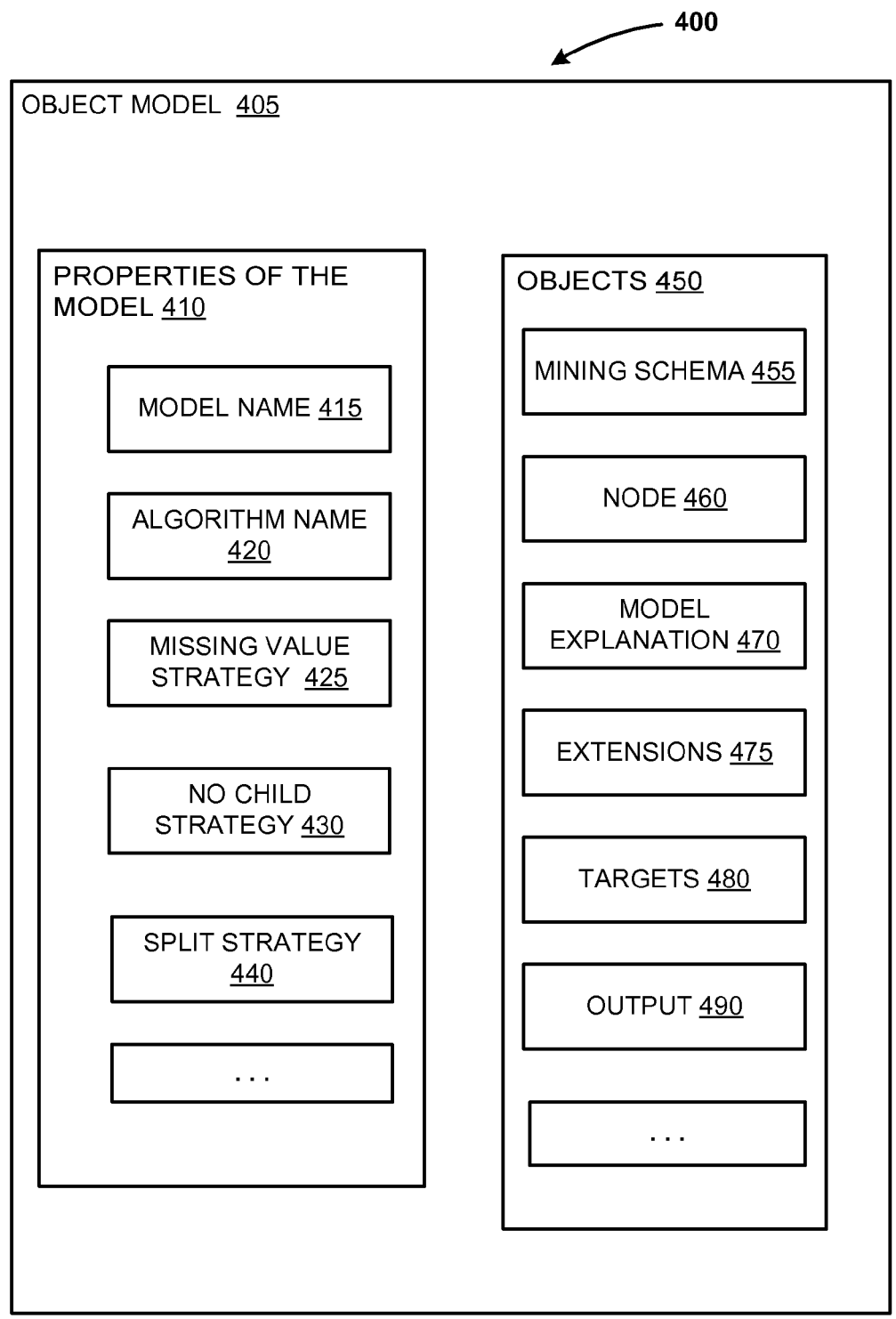
FIG. 4 is a block diagram illustrating an embodiment of an object model used for conversion of a data model into an in-database analysis model.

FIG. 4 is a block diagram illustrating an embodiment of an object model 405 used for conversion of a data model into an in-database analysis model. In one embodiment, the data model may be the data model 325 in FIG. 3B and the in-database analysis model may be the in-database model 335 in FIG. 3B. The object model 405 may correspond to the object model 330, FIG. 3B and may include common attributes (properties) of the algorithm applied for generating the data model. In one embodiment, the object model 405 may contain a list of objects 450 defined in the contents of the data model. For example, the data model may be a CNR Tree, such as the R-CNR tree 210 in FIG. 2. The object model 405 may be instantiated with concrete values defined in the data model to generate an instantiated object model, such as the instantiated object model 333, FIG. 3B. For example, the object model 405 and the instantiated object model (e.g. 333, FIG. 3B) may be implemented in a programming language such as Java, C++, etc.

In one embodiment, the list of objects 450 may include a mining schema 455 object, a node 460 object, a model explanation 470 object, extensions 475 object, targets 480 object, output 490 object. The list of objects 450 is not limited to the above mentioned exemplary objects. In one embodiment, the data mining schema 455 may give information about the schema that is used for analysis of a data set (e.g. historical data 105, FIG. 1A). If the generated model has a tree structure (such as the R-CNR Tree 210, FIG. 2), then the node 460 object may represent a node and nodes characteristics in a tree split. In one embodiment, the model explanation 470 object may give information about the type of the model, the quality and the confidence level defined for the model. In another embodiment, the output 490 object may define the characteristics of the output fields. In yet another embodiment, the object model 405 may include properties of the model 410. The list of properties may include a model name 415, an algorithm name 420, a missing value strategy 425, a no child strategy 430, a split strategy 440, etc.

Figure 5:
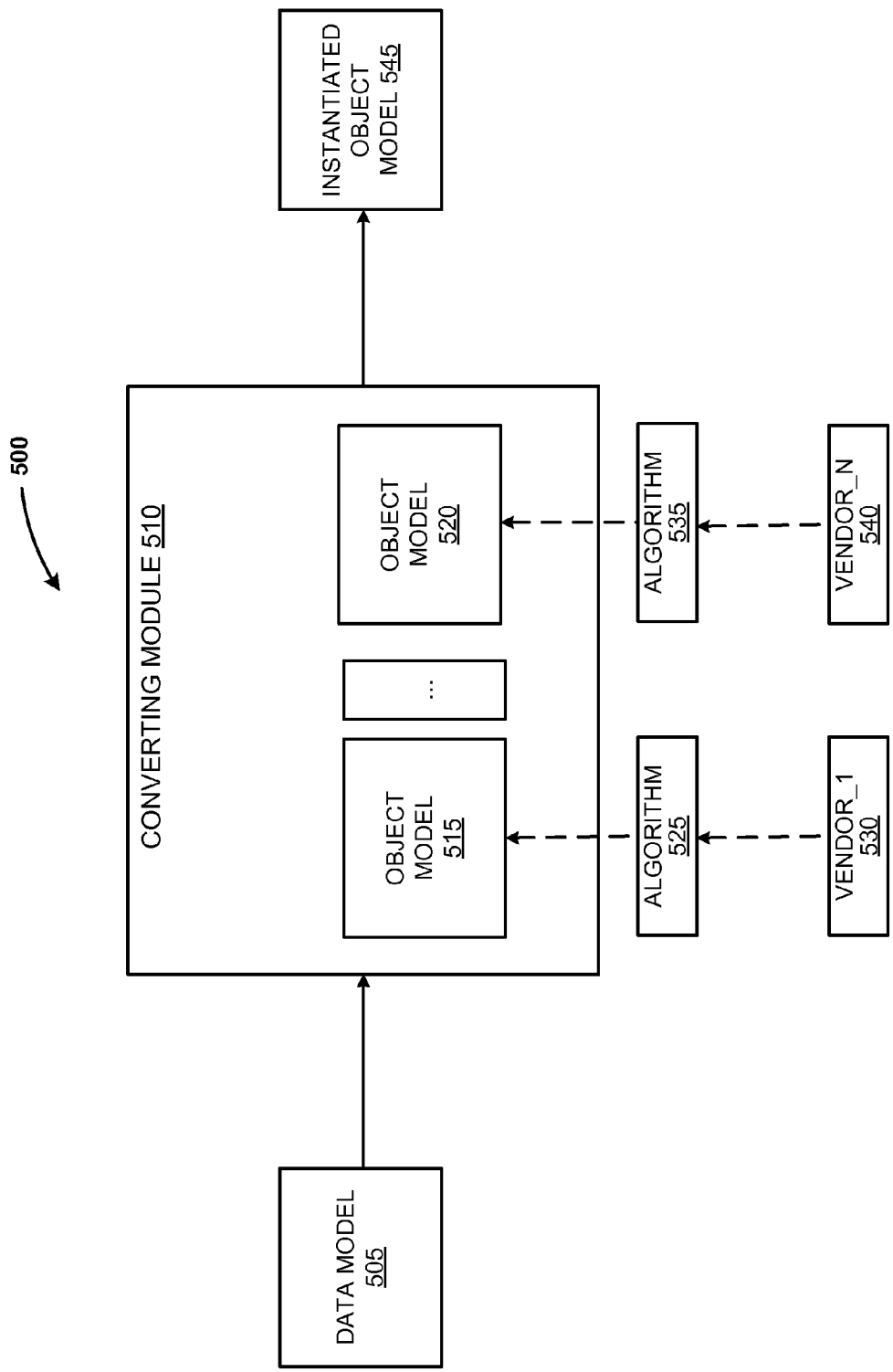
FIG. 5 is a block diagram illustrating an embodiment of a system for converting a data model into an in-database analysis model.

FIG. 5 is a block diagram illustrating an embodiment of a system 500 for conversion a data model 505 into an instantiated object model 545. The system 500 includes a converting module 510 that extracts information from the data model 605. In one embodiment the data model 605 is in a standard structural format, e.g. PMML format, JSON, XML, etc. The converting module 510 may use predefined object models that correspond to data mining algorithms applied on a data set for generating data models. In one embodiment, the converting module 510 may include an object model 515, an object model 520, and other object models that correspond respectively to an algorithm 525, an algorithm 535, and other. The algorithms 525 and 535 may be such as the algorithms that the data mining application 135 in FIG. 1B is providing for data analysis. The algorithms 525 and 535 may be provided from different or equal vendors, such as Vendor_1 530 and Vendor_N 540. Based on the objects model 515, object model 520, etc., the data model 505 is converted to an instantiated object model 545. According to the algorithm that was applied, an appropriate and corresponding object model from the existing object models in the converting module 610 is selected and an instance of the object model is implemented. The object model may include defined classes corresponding to the structural elements of the data model 505.

In one embodiment, the object models may be such as the object model 405 in FIG. 4. The instantiated object model 545 may be created based on the accumulated information read from the data model 505. For example, if the data model 505 is in a PMML file format, the file can be read into Java as a byte stream, and be converted into an instantiated object model implemented in Java. The data model 505 in PMML format can be converted to a programming representation of the data model in Java in the form of the instantiated object model 545. Defined Java objects in the object model may be used for the conversion between the data model 505 to the instantiated object model 545. For example, the data model 505 presented in a PMML format in Table 1 can be converted to an instance of the object model. The data model in Table 1 is a tree model generated based on the R-CNR tree algorithm. Table 2 presents part of exemplary Java code that can be used for the conversion. Through specific Java objects, different algorithms are distinguished. Required information is extracted with the use of the "parseModel" method (lines 1-10, Table 1). A list (at line 12, Table 1) is created with the models read from the PMML file and the tree model object ("treeMdl") is extracted from the list.

In one embodiment, models defined in PMML may be mapped to specific java objects based on predefined mechanism. The result of the conversion can be a specific algorithm object of a data model implemented in a programming language. The Java code between lines 14 to 25 extracts information from the "treeMdl" model. The information in the "treeMdl" object can be used by other Java objects. For example, information about the mining schema, nodes, targets, etc. is extracted. The result after the conversion is a collection of objects containing the logic implemented into the data model 505 together with the suggested arithmetic operations. The collection of objects may be used to create entities with similar functioning. The instantiated object model may be an example of the instantiated object model 545.

TABLE 2

```
1.  public void parseModel(byte[ ] modelBytes) throws JAXBException {
2.      super.startParseModel(modelBytes);
3.      List modelsInPmml =
            this.getPmml( ).getAssociationModelOrClusteringModelOr-
            GeneralRegressionModel( );
4.      for(int i=0;i<modelsInPmml.size( );i++){
5.          Object model = modelsInPmml.get(i);
6.          if(model instanceof TreeModel){
7.              treeMdl = (TreeModel) model;
8.              break;
9.          }
10.     }
11.
12.     List contents = treeMdl.getContent( );
13.     for(int i=0;i<contents.size( );i++){
14.         Object content = contents.get(i);
15.         if(content instanceof MiningSchema){
16.             this.setMiningSchema((MiningSchema) content);
17.         }
18.         else if(content instanceof Node){
19.             rootNode = (Node) content;
20.         }
21.         else if(content instanceof Targets){
22.             this.setTargets((Targets) content);
23.         }
24.         else if(content instanceof Output){
25.             this. setOutputs((Output) content);
26.         }
27.     }
28. }
```

Figure 6:
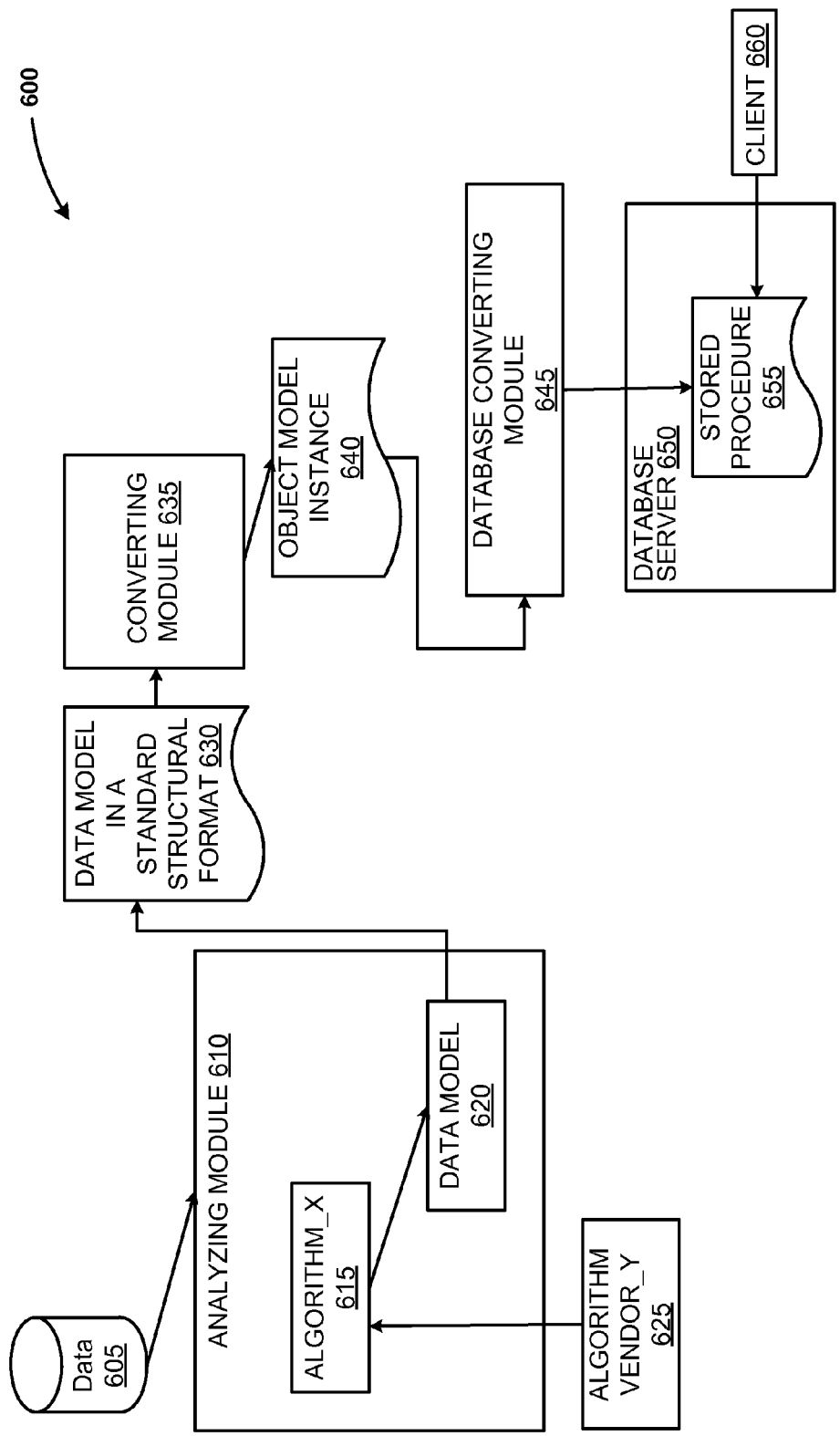
FIG. 6 is a block diagram illustrating an embodiment of a system for conversion of a data model into an instantiated object model.

FIG. 6 is a block diagram illustrating an embodiment of a system 600 for converting a data model 605 into an in-database analysis model. In one embodiment, an analyzing module 610 retrieves the data 605 and processes the data 605 based on an Algorithm_X 615 that may be provided by Algorithm Vendor_Y 625. In one embodiment, the data 605 may be filtered before applying the Algorithm_X 615 to reduce and clear the data 605 from inconsistencies. A data model 620 may be generated. The data model 620 may be transformed in a standard format, such as the PMML format, and a data model in a standard structural format 630 may be generated. The system 600 includes a converting module 635 that receives and converts the data model in the standard structural format 630 into an object model instance 640. The object model instance 640 may be an instance of a predefined object model that corresponds to the applied algorithm for generating the data model in the standard structural format 630. In one embodiment, the generated object model instance 640 may include a set of objects that corresponds to structural elements of the data model 620. For example, the predefined object model may correspond to the Algorithm_X 615 that was applied on the data 605. A database converting module 645, part of the system 600, may convert the object model instance 640 into an in-database analysis model that may be executed in any database system. In another embodiment, the object model instance 640 may be transformed into commands to be executed within a database that form the in-database analysis model. The in-database analysis model may be stored on a database server 650 as a stored procedure 655. The stored procedure 655 may replicate the behavior of the data model 620. A client 660 may consume the stored procedure 655 to score new data with the data model 620 that is present on the database server. In such manner, datasets may be mined within the database by applying numerous algorithms that are incorporated in the database, such as the stored procedure 655. In one embodiment, the client 660 may be a predictive analysis application that applies data models to score data sets stored on the database server 650 with the use of in-memory processing. The client 660 may communicate with the database server 650 through a standard interfaces, e.g., Java Data Base Connectivity (JDBC) interface provided by Oracle®, the Open Data Base Connectivity (ODBC) interface, a traditional programming runtime like Java® Runtime Environment (JRE), etc. In another embodiment, the client 660 may be a development environment that connects to a database system comprising a database server such as the database server 650, where the database server 650 includes stored procedures (such as the stored procedure 655) to apply analyzes over data by using a defined data model, such as the data model 620.

The process of executing data-intensive logic implemented with an imperative language (e.g. Java) is hard to optimize. In one embodiment, if the application logic is executed mainly on the application server, data needs to be copied from the database into the application server. Structured Query Language (SQL) is a declarative set-oriented language that may allow parallelized processing of data stored in rows in a table. The SQLScript language is a collection of extensions to SQL. The extensions may be procedural extensions, which provide imperative constructs executed in the context of the database. With the use of SQLScript data-intensive application logic may be embedded into the database system. In one embodiment, the in-database analysis model may be defined as a stored procedure written in a database native language. The stored procedure may be defined in SQLScript in the form of a series of SQL statements. The SQLScript may allow pushing data intensive logic into the database to avoid data copies to the application server and leverage parallel execution strategies of the database. In another embodiment, the in-database analysis model may be stored as a stored procedure on a database system. The body of the procedure may include a sequence of statements that specify a transformation of some data (by means of relational operations such as selection, projection) and binds the result to an output variable of the procedure.

In one embodiment, the instantiated object model instance 640 may be converted into the in-database analysis model by representing elements (objects) from the object model instance 640 as conditions. In another embodiment, objects from the instantiated object model may be written as a SELECT statement that may return output values defined in the instantiated object model. For example, node with id equal to "8", from the model presented in Table 1, may be converted with the use of a predefined object model into an instance of a java object "Node", and that java object may be converted into an equivalent SQL script—CE_PROJECTION(:temp_table, ["Staff", "Margin", "Turnover", CE_CALC('1',Integer) as "PredictedValue","row_id"],' "Margin"<1.5 and "Size"<3.5 and "Staff"<5.7 and "Turnover"<7.05 and "Turnover">=5.55'). The "CE_CALC" function writes the predicted value to be "1" as this is the majority value set for the node. The WHERE clause contains five clauses joined by an "and" operator. The last one is the limiting condition of the leaf node (Node id="8") and the other 4 were inherited from its parents split condition.

Table 3 is an exemplary in-database analysis model defined as a stored procedure in the SQLScript language. Table 3 presents the in-database analysis model which is converted from the data model defined in PMML format in Table 1. Each of the leaf nodes in the tree structure from Table 1 is represented by a CE_PROJECTION statement in the stored procedure. The outputs of all the projections are put into a union, which gives the final result.

TABLE 3

```
CREATE PROCEDURE "PROCEDURE_NAME1" (OUT tempFinal
"OUTPUT_TABLE_TYPE1")
LANGUAGE SQLSCRIPT AS
BEGIN
temp_table= select * from "INPUT_TABLE1";
temp0=CE_PROJECTION(:temp_table,,[%ALL_INPUT_COLUMNS%,
CE_CALC('1',
%PREDICTED_COLUMN_TYPE%) as "PredictedValue" ,"row_id"],'
"Staff" >= 4.25 and "Turnover" < 7.05 and "Turnover" < 5.55');
temp 1=CE_PROJECTION(:temp_table,,[%ALL_INPUT_COLUMNS%,
CE_CALC('3',
%PREDICTED_COLUMN_TYPE%) as "PredictedValue" ,"row_id"],'
"Staff" >= 4.25 and "Turnover" < 7.05 and "Turnover" < 5.55');
temp2=CE_PROJECTION(:temp_table,,[%ALL_INPUT_COLUMNS%,
CE_CALC('2',
%PREDICTED_COLUMN_TYPE%) as "PredictedValue" ,"row_id"],'
"Staff" >= 4.25 and "Turnover" >= 7.05');
temp3=CE_PROJECTION(:temp_table,,[%ALL_INPUT_COLUMNS%,
CE_CALC('3',
%PREDICTED_COLUMN_TYPE%) as "PredictedValue" ,"row_id"],'
"Staff" < 4.25'); tempUnion1=CE_UNION_ALL(:temp0,:temp1);
tempUnion2=CE_UNION_ALL(:temp2,:temp3);
tempFinal=CE_UNION_ALL(:tempUnion1,:tempUnion2);
END;
```

Figure 7:
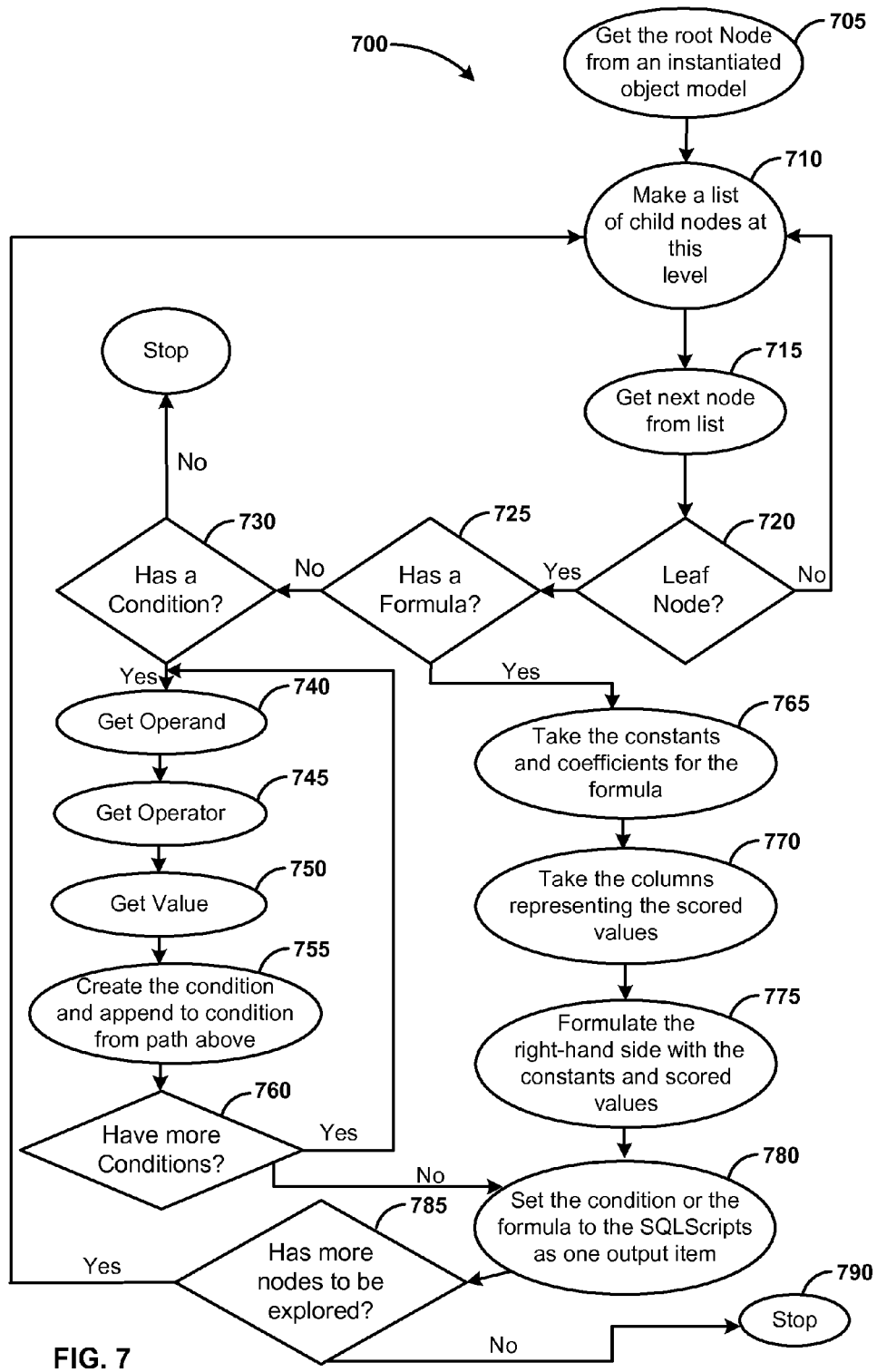
FIG. 7 is a flow diagram illustrating an embodiment of a method for converting an instantiated object model of a tree model into a stored procedure in SQLScript language.

FIG. 7 is a flow diagram illustrating an embodiment of a method 700 for converting an instantiated object model of a tree model into a stored procedure in SQLScript language. In one embodiment, the instantiated object model may be generated based on converting a tree data model by the converting module 510 in FIG. 5. The tree data model may be such as the tree model in PMML format in Table 1. The instantiated object model may be determined based on conversion accomplished by a converting module such as the converting module 635 in FIG. 6. At process step 705, the object from the instantiated object model representing the root node in the data model is received and the root node becomes the currently evaluated node. All of the child nodes of the currently evaluated node are collected in a list at process step 710. At process step 715, a node from the list of all child nodes is taken. At decision block 720, the taken node is evaluated whether it is a leaf node. If the taken node is not a leaf node, at process step 710, the taken node becomes the currently evaluated node and all of the child nodes of the currently evaluated node are collected in a list. If the evaluated node at decision block 720 is a leaf node, then at decision block 725 it is determined whether the node has a formula in its definition. A node from the tree model is expected to have a defined formula or a condition. When at decision block 730 it is determined that there is no condition in the node, the method 700 stops. If at decision block 725 it is determined that there is a formula, then at process step 765 the constants and the coefficients from the formula are taken. At process step 770, the columns that represent the values that are scored with the data model are also taken. At process step 775, the right-hand side of the formula is defined with the taken constants and the columns. If at decision block 730 it is determined that there is a condition, then the operand is taken at process step 740. At process step 745, the operator is taken out of the condition, and at process step 750, the value is taken from the condition. At process step 755, the condition is recreated and appended to a list of conditions to formulate a compound condition. At decision block 760, it is determined whether there are more conditions in the taken leaf node. If there are more conditions, process step 740, 745, and 750 are executed. If at decision block 760 it is determined that there are no more conditions, at process step 780, the defined compound condition or the formulated right-hand side of the formula is added to the definition of the stored procedure written in SQLScript in the form of an output item. At decision block 785, it is determined whether there are more nodes to be explored. If all of the nodes are evaluated, then the process stops. If there are more nodes to be evaluated, the process goes to process step 710 and continues in the same manner.

Figure 8:
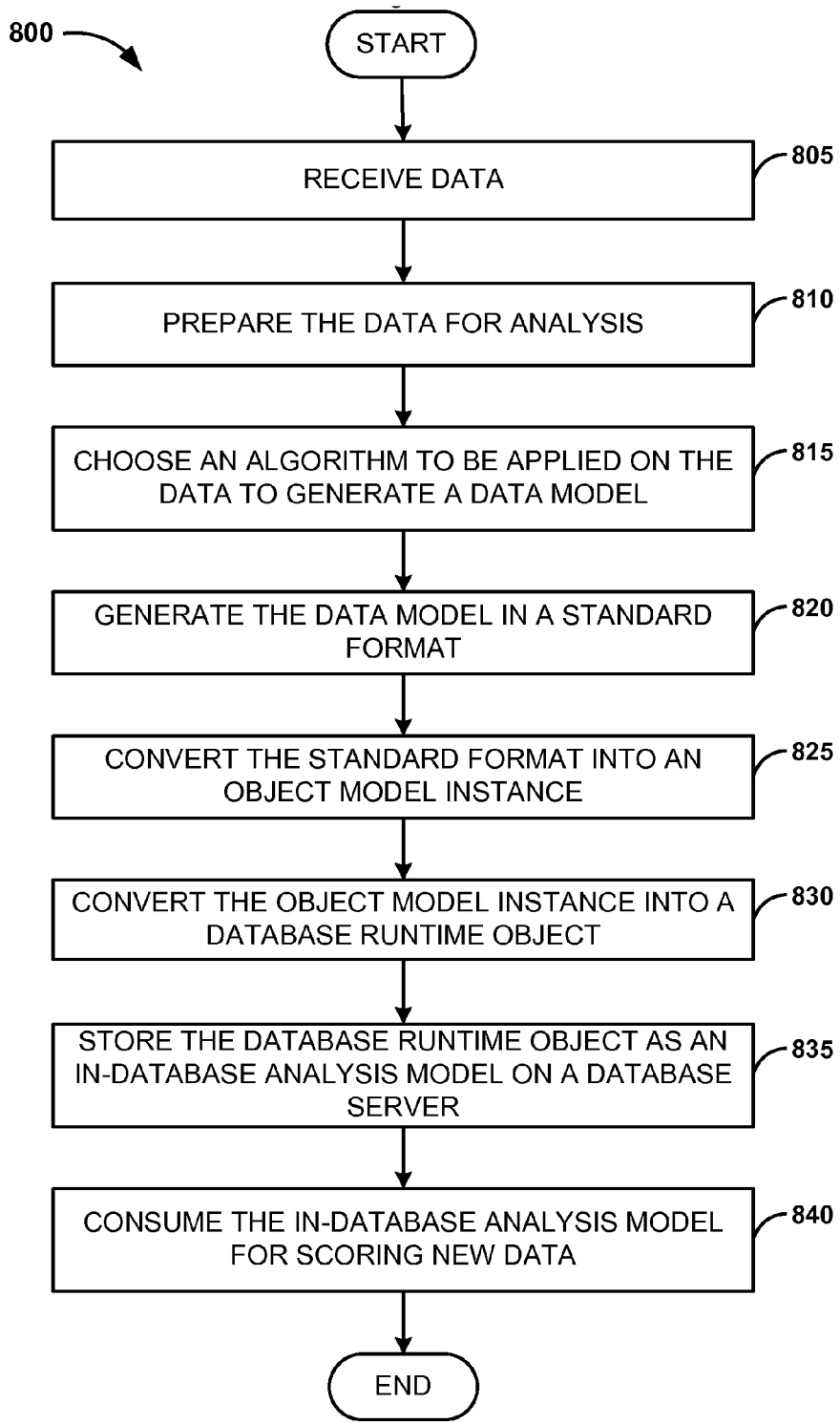
FIG. 8 is a flow diagram illustrating an embodiment of a method for converting a data model into an in-database analysis model for scoring data within a database system.

FIG. 8 is a flow diagram illustrating an embodiment of a method 800 for converting a data model into an in-database analysis model for scoring data within a database system. At process step 805, data is received for generating a data model. The data may be received from a data storage in a file format. The received data is prepared for analysis at process step 810. For generating a data model, an analyzing algorithm may be applied. Predictive (data mining) algorithm may be provided from different algorithm sources from different vendors or providers. At process step 815, an algorithm is chosen. The algorithm can be applied on the received data and a data model may be generated. For example, the chosen algorithm may be the CNR tree algorithm. The chosen algorithm may be applied on the received data, and at process step 820, a data model may be generated. The data model may be stored in a standard format, such as PMML format. At process step 825, the data model in standard format is converted into an instance of an object model, such as the instantiated object model 545. The instantiated object model is an object model corresponding to the chosen algorithm that is instantiated with the data that is generated in the generated data model. At step 830, the instantiated object model is converted into a database runtime object. At process step 835, the database runtime object is stored as an in-database analysis model on a database server. In one embodiment, the in-database analysis model may be such as the in-database model 335, FIG. 3B. The in-database analysis model corresponds to the generated data model and may be consumed at process step 840 for scoring new data. The in-database analysis model may be provided as an analytical model part of a database system that does not comprise the data that was used for generating the data model. In one embodiment, the in-database analysis model may be stored in the form of a stored procedure in the database system. The stored procedure may be compiled during its creation and syntax error may be reported. The process of scoring may be accomplished in-memory within the database system to save computing resources. The in-database analysis model may be consumed by a client application that communicates through a connection to the database system that includes the analytical capabilities provided by the in-database analysis model. In one embodiment, the database system may provide the stored procedure through a consuming service that can be accessed by the client application.

Figure 9:
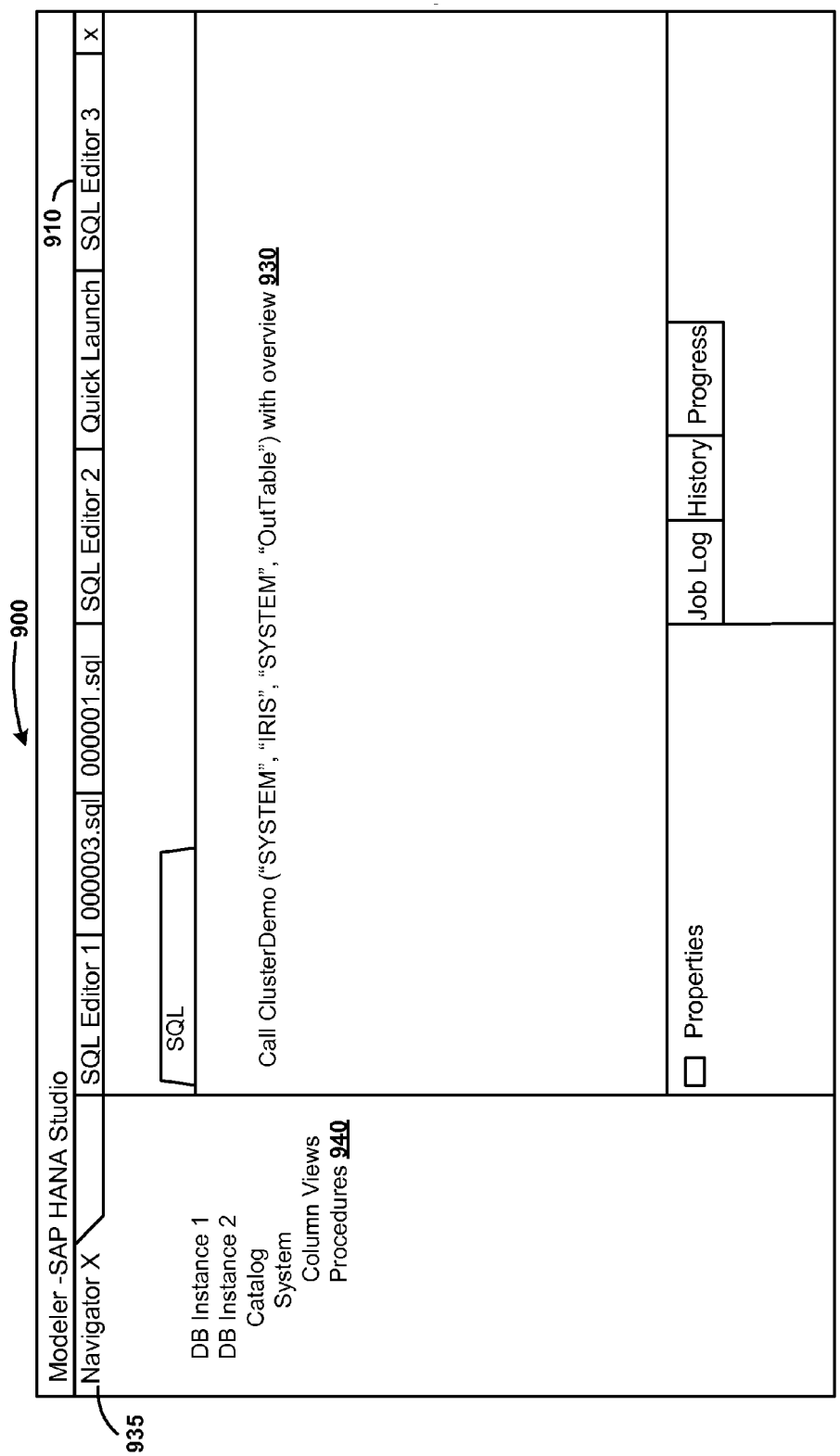
FIG. 9 is an exemplary screenshot, depicting an embodiment of a development environment of a client application that may score data with an in-database analysis model within a database system.

FIG. 9 is an exemplary screenshot, depicting an embodiment of a development environment 900 of a client application that may score data with an in-database analysis model within a database system. In one embodiment, the client application may have a modeler perspective comprising a "Navigator" 935 area that lists instances of database systems, which may be called and available data and functionality may be consumed. For example, such database systems may comprise stored procedure, such as Procedures 940 node that includes a list of names of procedures. The stored procedure part of the Procedures 940 node represent database entities. A "PDN-SQL Editor 3" 910 tab is an SQL development editor where SQL statements may be defined. The SQL statement 930—"call ClusterDemo ("SYSTEM". "IRIS", "SYSTEM"."OutTable") with overview" is a statement that calls the execution of a stored procedure "ClusterDemo". The syntax "call . . . with overview" may be used with a procedure to write the result of a procedure call directly into a physical table. The result is one result set that holds the information about a table and contains the result of a particular table's output variable. In one embodiment, the stored procedure "ClusterDemo" may be an in-database analysis model, such as the stored in-database analysis model at process step 835 on FIG. 8.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 10:
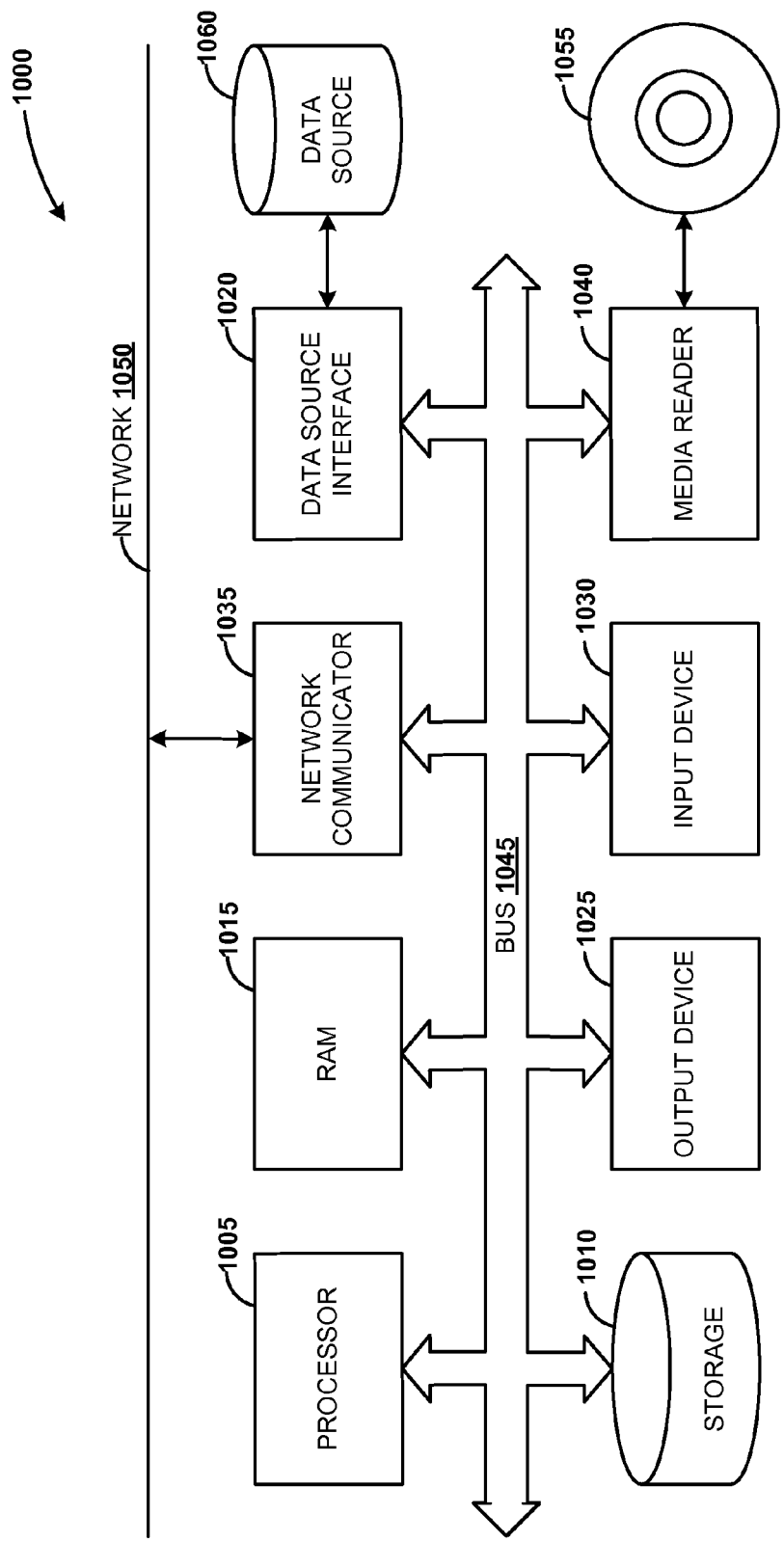
FIG. 10 is a block diagram illustrating an embodiment of a computing environment in which the techniques described for remotely managing application log levels for logger objects in application components deployed on a cloud platform can be implemented.

FIG. 10 is a block diagram of an exemplary computer system 1000. The computer system 1000 includes a processor 1005 that executes software instructions or code stored on a computer readable storage medium 1055 to perform the above-illustrated methods. The processor 1005 can include a plurality of cores. The computer system 1000 includes a media reader 1040 to read the instructions from the computer readable storage medium 1055 and store the instructions in storage 1010 or in random access memory (RAM) 1015. The storage 1010 provides a large space for keeping static data where at least some instructions could be stored for later execution. According to some embodiments, such as some in-memory computing system embodiments, the RAM 1015 can have sufficient storage capacity to store much of the data required for processing in the RAM 1015 instead of in the storage 1010. In some embodiments, all of the data required for processing may be stored in the RAM 1015. The stored instructions may be further compiled to generate other representations of the instructions and dynamically stored in the RAM 1015. The processor 1005 reads instructions from the RAM 1015 and performs actions as instructed. According to one embodiment, the computer system 1000 further includes an output device 1025 (e.g., a display) to provide at least some of the results of the execution as output including, but not limited to, visual information to users and an input device 1030 to provide a user or another device with means for entering data and/or otherwise interact with the computer system 1000. Each of these output devices 1025 and input devices 1030 could be joined by one or more additional peripherals to further expand the capabilities of the computer system 1000. A network communicator 1035 may be provided to connect the computer system 1000 to a network 1050 and in turn to other devices connected to the network 1050 including other clients, servers, data stores, and interfaces, for instance. The modules of the computer system 1000 are interconnected via a bus 1045. Computer system 1000 includes a data source interface 1020 to access data source 1060. The data source 1060 can be accessed via one or more abstraction layers implemented in hardware or software. For example, the data source 1060 may be accessed by network 1050. In some embodiments the data source 1060 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the invention are described herein for illustrative purposes, various equivalent modifications are possible within the scope of the invention, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method for converting a data model into an in-database analysis model to score data within a database system, the method comprising:
    converting a data model into an instantiated object model, wherein the converting comprises:
        parsing the data model in a standard structural format to receive content of the data model; and
        generating the instantiated object model by instantiating a set of objects defined in a basic object model with the received content of the data model, wherein the set of objects of the basic object model are mapped to structural elements of the data model, and wherein the instantiated object model comprises logic implemented into the data model and suggested arithmetic operations from the data model, and wherein the basic object model corresponds to an algorithm for generating the data model;
    converting the instantiated object model into the in-database analysis model to be stored in the database system, wherein the in-database analysis model comprises executable commands created in a database native language based on transforming the instantiated set of objects of the instantiated object model to include the logic implemented into the data model and the suggested arithmetic operations from the data model; and
    storing the in-database analysis model as a stored procedure in a compiled form on a database server part of the database system.

2. The method of claim 1, further comprising:
    receiving a data set from a data source;
    analyzing the data set; and
    generating the data model.

3. The method of claim 2, wherein analyzing the data set comprises:
    defining the algorithm to be applied on the data set to generate the data model.

4. The method of claim 3, wherein the algorithm applied on the data set is selected from a set of algorithms provided by algorithm sources.

5. The method of claim 2, further comprising:
    applying a filtering method and a sampling method on the data set to reduce the data set.

6. The method of claim 1, wherein the standard structural format is represented in Predictive Modeling Markup Language (PMML).

7. The method of claim 1, further comprising:
    scoring the data with the in-database analysis model within the database system.

8. The method of claim 7, wherein the in-database analysis model is provided to a client to score the data with the in-database analysis model within the database system through a consuming service.

9. The method of claim 1, wherein the executable commands are combined according to logic implemented into the data model.

10. A computer system for converting a data model into an in-database analysis model to score data within a database system, the system comprising:
    a processor;
    a memory in association with the processor storing instructions related to:
        an analyzing module to:
            receive a data set from a data source to analyze the data set;
            apply an algorithm on the data set to generate the data model; and
            save the data model in a standard structural format;
        a converting module to convert the data model into an instantiated object model, wherein the converting module is further operable to:
            parse the data model in the standard structural format to receive content of the data model; and
            generate the instantiated object model by instantiating a set of objects defined in a basic object model with the received content of the data model, wherein the set of objects in the basic object model are mapped to structural elements of the data model, and wherein the set of instantiated objects in the instantiated object model comprise logic implemented into the data model and suggested arithmetic operations from the data model, and wherein the basic object model corresponds to the algorithm for generating the data model; and
        a database converting module to convert the instantiated object model into the in-database analysis model to be stored in the database system, wherein the in-database analysis model comprises executable commands created in a database native language based on transforming the instantiated set of objects of the instantiated object model to include the logic implemented into the data model and the suggested arithmetic operations from the data model; and
    the database system comprising:
        a database server to store the in-database analysis model as a stored procedure in a compiled form, wherein the in-database analysis model is executed within the database system.

11. The system of claim 10, wherein the algorithm applied on the data set is selected from a set of algorithms provided by algorithm sources.

12. The system of claim 10, wherein the standard structural format is represented in Predictive Modeling Markup Language (PMML).

13. The system of claim 10, wherein the database system is operable to provide the in-database analysis model to a client to score the data with the in-database model through a consuming service.

14. The system of claim 10, wherein the executable commands are combined according to logic implemented into the data model.

15. An article of manufacture for converting a data model into an in-database analysis model to score data within a database system, comprising a non-transitory computer readable medium including executable instructions, which when executed by a computer, cause the computer to:
- convert a data model in a standard structural format into an instantiated object model by:
  - parsing the data model in the standard structural format to receive content of the data model; and
  - generating the instantiated object model by instantiating a set of objects defined in a basic object model with the received content of the data model, wherein the set of objects in the basic object model are mapped to structural elements of the data model, and wherein the set of instantiated objects in the instantiated object model comprise logic implemented into the data model and suggested arithmetic operations from the data model, and wherein the basic corresponds to an algorithm for generating the data model;
- convert the instantiated object model into the in-database analysis model to be stored in the database system, wherein the in-database analysis model comprises executable commands created in a database native language based on transforming the set of instantiated objects of the instantiated object model to include the logic implemented into the data model and the suggested arithmetic operations from the data model; and
- store the in-database analysis model as a stored procedure in a compiled form on a database server.

16. The article of manufacture of claim 15, further comprising instructions, which when executed by a computer, cause the computer to:
- receive a data set from a data source;
- define the algorithm to be applied on the data set to analyze the data set and to generate the data model; and
- save the data model in the standard structural format.

17. The article of manufacture of claim 16, wherein the algorithm applied on the data set is selected from a set of algorithms provided by algorithm sources.

18. The article of manufacture of claim 15, further comprising instructions, which when executed by a computer, cause the computer to:
- provide the in-database analysis model to be consumed by a client to score the data within the database system through a consuming service.

\* \* \* \* \*